US008135075B2

(12) United States Patent
Gastinger et al.

(10) Patent No.: US 8,135,075 B2
(45) Date of Patent: Mar. 13, 2012

(54) METHOD AND DEVICES FOR PROCESSING AND REESTABLISHING MULTIMEDIA STREAMS

(75) Inventors: Rene Gastinger, Rennes (FR); Christophe Cutullic, Domloup (FR); Erich Decerf, Fougeres (FR)

(73) Assignee: France Telecom, Paris (FR)

( * ) Notice: Subject to any disclaimer, the term of this patent is extended or adjusted under 35 U.S.C. 154(b) by 1105 days.

(21) Appl. No.: 11/632,069

(22) PCT Filed: Jul. 11, 2005

(86) PCT No.: PCT/FR2005/001785
§ 371 (c)(1),
(2), (4) Date: Jan. 4, 2008

(87) PCT Pub. No.: WO2006/016057
PCT Pub. Date: Feb. 16, 2006

(65) Prior Publication Data
US 2008/0120659 A1 May 22, 2008

(30) Foreign Application Priority Data
Jul. 12, 2004 (FR) .................................. 04 07738

(51) Int. Cl.
*H04N 11/02* (2006.01)
(52) U.S. Cl. .................... 375/240.26; 386/83; 386/125; 725/13; 725/43; 725/46; 725/88
(58) Field of Classification Search .................. 386/83, 386/125; 725/13, 43, 46, 88; 375/240.26
See application file for complete search history.

(56) References Cited

U.S. PATENT DOCUMENTS

| 2002/0131772 | A1* | 9/2002 | Vrielink .......................... 386/125 |
| 2003/0063224 | A1  | 4/2003 | Iwamoto et al. |
| 2004/0258396 | A1* | 12/2004 | Nakamura et al. ............... 386/83 |
| 2005/0216941 | A1* | 9/2005 | Flanagan et al. ................. 725/88 |
| 2005/0246732 | A1* | 11/2005 | Dudkiewicz et al. ............ 725/13 |
| 2009/0044226 | A1* | 2/2009 | Ellis et al. ......................... 725/46 |
| 2010/0251303 | A1* | 9/2010 | Ellis et al. ......................... 725/43 |

FOREIGN PATENT DOCUMENTS

| EP | 1161087 A2 | 12/2001 |
| EP | 1331814 A2 | 7/2003 |
| WO | WO 02/37858 A2 | 5/2002 |
| WO | WO 02/078334 A1 | 10/2002 |

* cited by examiner

*Primary Examiner* — Ayaz Sheikh
*Assistant Examiner* — Andrew C Lee
(74) *Attorney, Agent, or Firm* — Miles & Stockbridge P.C.

(57) ABSTRACT

The invention relates to a process for automatic processing of multimedia streams (F1, F2, F3) intended to be reproduced on a reproduction terminal (T), including the following steps, implemented at the demand of a user (UT) of the terminal and consisting of:
reproducing a first stream on the terminal (step E1), then interrupting the reproduction of the first stream and reproducing a second stream on the terminal (step E4),
According to the invention, consisting of:
associating with each stream (F1, F2, F3) a preference indicator (IC1, IC2, IC3) specifying whether the corresponding stream (F1, F2, F3) is a principal stream or a secondary stream (step EM)
recording the first stream simultaneously with reproduction of the second stream if the first stream is a principal stream (step E6).
The invention also relates to a system, a recording device and a computer program suitable for the implementation of the process for processing the streams.

14 Claims, 3 Drawing Sheets

METHOD AND DEVICES FOR PROCESSING AND REESTABLISHING MULTIMEDIA STREAMS

Figure 1:
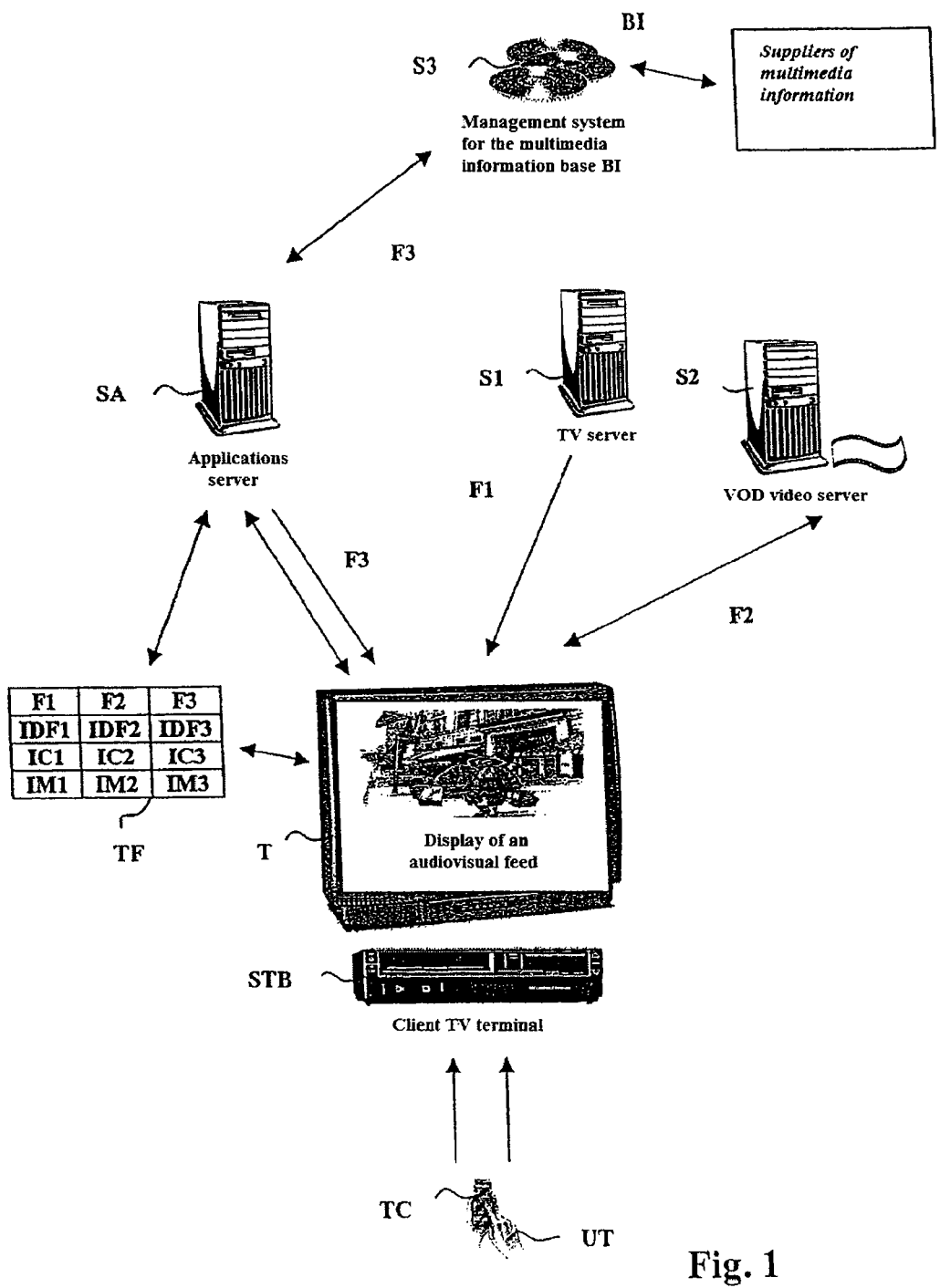

The invention relates to a process and device for automatic processing of audio and/or video streams which must be reproduced on a terminal, streams such as television broadcasts, pre-recorded or live, recorded or not, films broadcast on television channels, advertising films, video on demand (abbreviated as VOD) etc., i.e. streams broadcast remotely, the reproduction of which on a terminal must not be interrupted.

If, in the course of reproduction of a first stream (such as, for example, a film on a television channel), the user is temporarily interested in the reproduction of a second stream (such as, for example, a weather bulletin broadcast on another television channel, it is possible for him to switch from one to the other using a means of selection such as, for example, a remote control.

The disadvantage is that, when the user wishes to return to the first stream, he can not return to the place at which he left it, since the broadcast of the first stream has continued while the second stream was being reproduced.

The aim of the invention is to obtain a process and a device which make it possible to mitigate this disadvantage and to make reproduction of the first stream on the user's terminal more convenient and user-friendly.

To this end, a first subject of the invention is an automatic process for processing multimedia streams intended to be reproduced on a reproduction terminal, including the following steps, implemented at the demand of a user of the terminal and consisting of:
  reproducing a first stream on the terminal, then
  interrupting the reproduction of the first stream and reproducing a second stream on the terminal, According to the invention, the process also includes the following steps, consisting of:
  associating with each stream a preference indicator specifying whether the corresponding stream is a principal stream or secondary stream
  recording the first stream simultaneously with reproduction of the second stream if the first stream is a principal stream.

If the first stream is considered to be the principal stream it is stored so that the user may subsequently resume reproduction of this first stream from the moment at which he demanded to switch to the second stream, therefore without data loss. In order to do this, the process also includes the following steps, implemented simultaneously after reproduction of the second stream is stopped, consisting of:
  reproducing the first, previously-recorded stream
  continuing recording of the first stream The process also preferably includes an initialisation step during which a stream table is created in which a preference indicator is associated with each stream. According to a variation, during the initialisation step, a default value is assigned to each preference indicator, the default value of the preference indicator associated with a stream being:
  either the "secondary" value
  or a value specified by a supplier of said stream.

Again preferably the process is completed by a step in which the stream table is updated, implemented:
  on the instruction of the user and/or
  on the instruction of an authorised supplier and/or
  at each pre-defined action of the user, such as, for example, an order to update the stream table or an order to change the stream to be reproduced.

According to an improvement to the process of the invention, it is also arranged that:
  when the stream table is updated, a preference indicator and a modification indicator are associated with each stream,
  the preference indicator in the stream table is updated by the application server only if the priority level of the entity which demanded the update of said preference indicator is higher than the modification indicator associated with the preference indicator to be modified, then
  if an update has been implemented, the modification indicator associated with the updated preference indicator is replaced by the priority level associated F with the entity which demanded the modification.

The invention also relates to a computer programme stored on a computer medium; the programme includes instructions used to implement the process according to the invention as described above when it is loaded into and run by a computer system.

Another subject of the invention is a system for automatic processing of multimedia streams, including a terminal for reproduction of streams and a means of control to enable the user to interrupt the reproduction of a first stream and to demand the reproduction of a second stream on the terminal.

According to the invention, the system also includes:
  a means of managing the streams in order to associate with each stream a preference indicator specifying whether the corresponding stream is a principal stream or a secondary stream, and
  a recording device to record the first stream simultaneously with reproduction of the second stream if the first stream is a principal stream.

The system also preferably includes a means for reproducing the first, previously-recorded stream after reproduction of the second stream has stopped.

Finally another subject of the invention is a recording device which may be used in a system as described above and which includes:
  a storage device,
  an input/output device to receive a multimedia stream,
  a control device to record in the storage device a multimedia stream received by the input/output device if said stream is a principal stream which must be recorded.

According to another particular arrangement, the recording device may be external to the terminal, for example on an attached server, or may be a specific device. The terminal may then only include, for example, the means for managing the streams and the means of control for automatically controlling said recording device.

Figure 2:
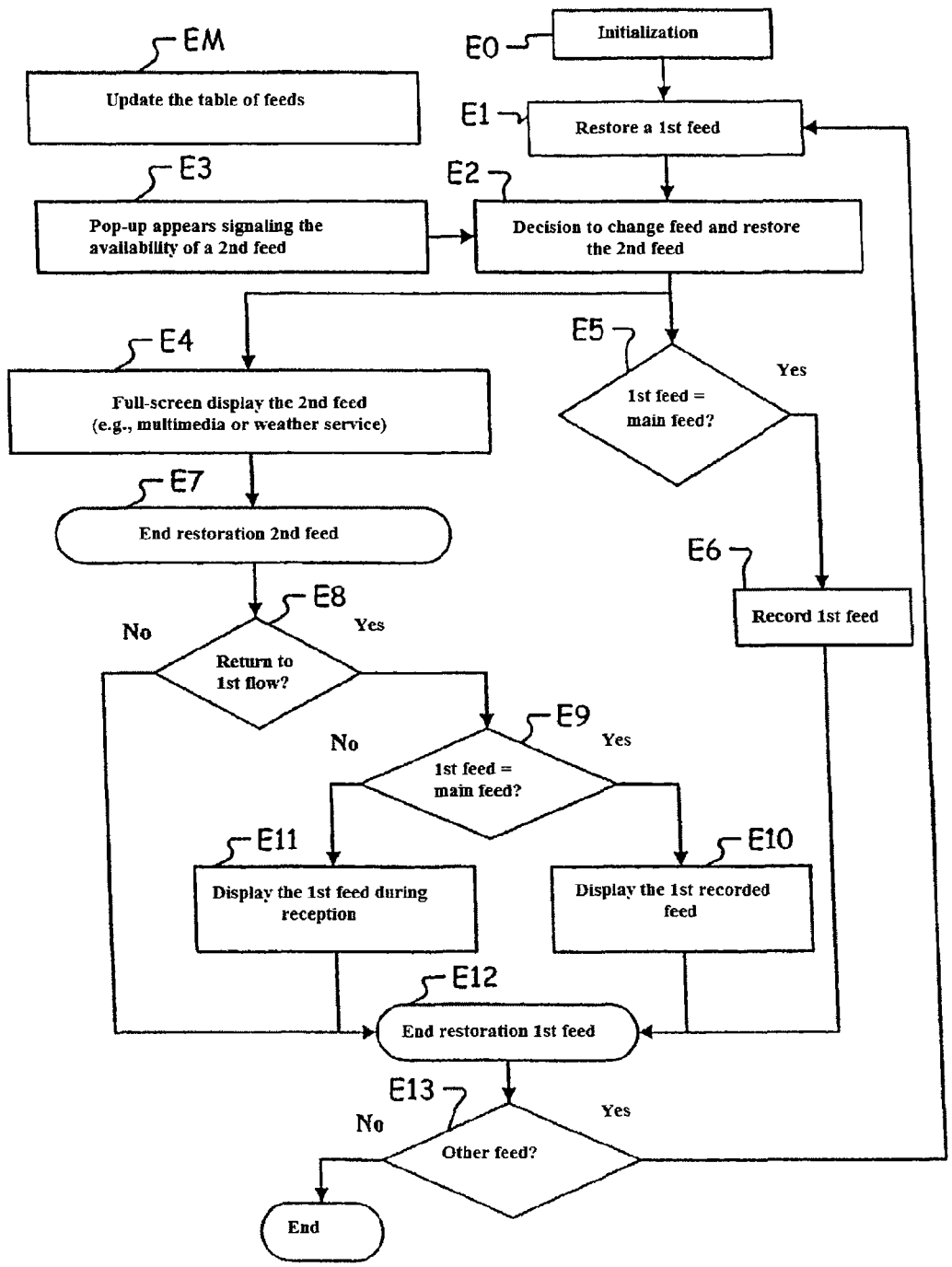
Figure 3:
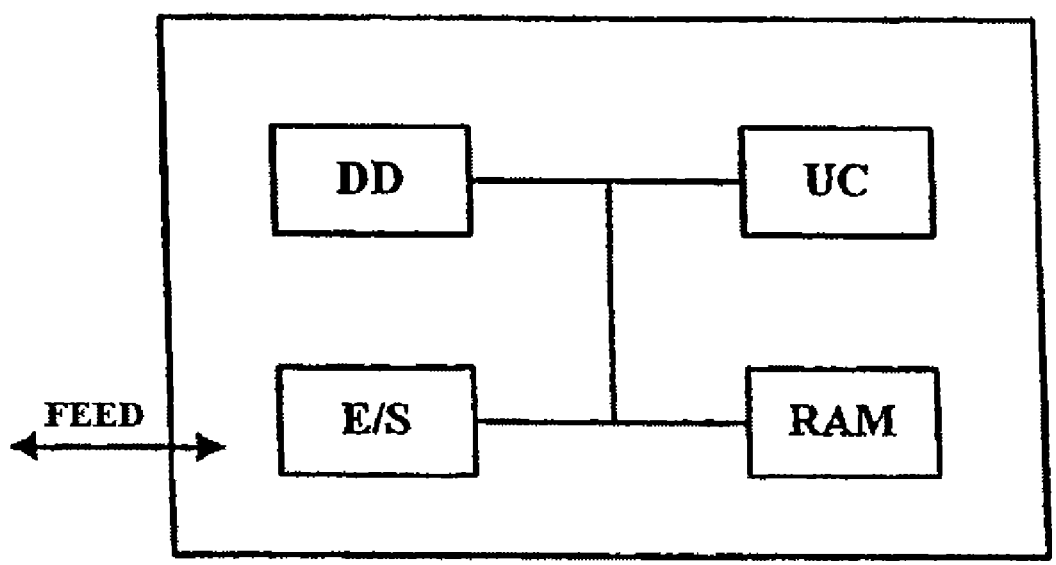

Other characteristics and advantages of the invention will be clearly evident from the description given below of a processing process according to the invention and an associated device. This description, which is given for illustration and is in no way exhaustive, refers to the attached drawings, in which:

FIG. 1 represents schematically a device for automatic processing of streams, implementing the automatic processing process according to the invention, FIG. 2 represents in the form of a flow chart the different steps of the processing process according to the invention, and FIG. 3 is a recording device which can be used to implement the process according to the invention.

In FIG. 1, a user UT has a terminal T for reproduction of a multimedia stream; this stream carries a multimedia content containing data having a meaning for the user UT and intended to be presented to him by the terminal T. The term "multimedia" is understood in the wide sense of audio and/or video and/or other data, such as, for example, a film, music or more generally any audio-visual F or multimedia work.

Reproduction of streams or information received by the terminal may take the form, for example, of an on-screen display and/or a sound broadcast from one or more speakers. In the example in FIG. 1, the reproduction, terminal T is a television, possibly fitted with a decoder or STB (Set Top Box). In another example, not shown, the reproduction terminal T is a computer or portable telephone having a display monitor and/or speaker.

The multimedia stream F1, F2 originates from outside the reproduction terminal T. Stream F1, F2 originates, for example, from a television server S1 or an on-demand video server S2 containing possibly in addition a catalogue and trailers. The servers S1, S2 are located remotely from the terminal T.

In addition to streams F1, F2 present on the servers S1, S2, there is provision for reproduction of multimedia data I1, I2 on users' terminals. These data I1, I2 may be reproduced simultaneously or in place of streams F1, F2. Each item of multimedia data may be provided for several of the streams F1, F2, for each of these or for all streams F1, F2; each piece of data may be associated with a specific stream F1, F2 or may be independent of these. The multimedia data I1, I2 are multimedia content such as, for example, text messages, animated or fixed images, sounds, videos, interactive applications (games, on-line shopping services etc.). These multimedia data are produced by one or more suppliers or operators FI, which may be the same as those who own servers S1, S2. These data are, for example, produced when streams F1, F2 are recorded on servers S1, S2 or as a result of this recording. Multimedia data are sent and stored by the supplier or suppliers FI in a base BI so that it can be sent to users; terminals. The database BI is located remotely from terminal T; a management system S3 for the base BI manages the content of the base BI and particularly the exchanges between the base BI and the applications server SA to which the multimedia data are sent in the form of a stream F3; the server SA then rebroadcasts this stream F3 simultaneously with a stream F1 or F2 reproduced on the terminal T, or in place of this stream F1, F2, according to the instructions sent by the management system for the multimedia data base and/or according to requests from the user.

Only three streams have been described here, essentially in order to describe the three main types of streams which can be received by a terminal. Of course, the same terminal can receive many other streams and particularly several streams supplied by different TV servers, different video servers etc.

Each stream F1, F2, F3 has associated with it, for example, respectively a stream identifier IDF1, IDF2, IDF3 on servers S1, S2 and base BI. In order to view or hear a film, programme etc., the user UT selects on his reproduction terminal T a stream F1, F2, F3 from those present on the servers S1, S2 or the base BI.

The user selects a stream with the aid of a means of selection TC, which is a remote control in the example in FIG. 1. The means of selection TC may also be a keyboard, tablet, touch screen, voice interface etc. This selection is made in the standard manner in the case of a television, for example from a choice of television channels received and accessible on-line by STB terminals or PCs connected to the Internet or by selecting the identifier for the chosen stream from those in a catalogue or programme guide sent by server S1 and/or S2 to terminal T.

Each stream identifier IDF1, IDF2, IDF3 displayed on the screen of terminal T may, for example, be scanned by displaying on the terminal T text or an image illustrating the associated content, for example the poster, summary of the film or broadcast carried by this stream, a trailer, additional data being sent with the stream identifier by the server S1, S2 and/or the base BI to terminal T.

According to the invention, each stream F1, F2, F3 accessible from the terminal also has associated with it a preference indicator, respectively IC1, IC2, IC3 (for example a Boolean indicator, 1/0 or yes/no) indicating whether the stream F1, F2, F3 is a principal stream or not. A table TF is created and stored on the application server SA: this is a stream table listing the different streams F1, F2 accessible at a given moment from terminal T with, for each stream, the identifier IDF1, IDF2, IDF3 and the corresponding preference indicator IC1, IC2, IC3.

Throughout the text of this patent application, a stream is called principal or secondary according to the value of its preference indicator. A stream is called principal (positive preference indicator, having for example as value 1, yes, etc.) if its content must be recorded, for example if it is considered to be important, essential, indispensable etc. to the user. Conversely, a stream is called secondary (negative preference indicator, having for example as value 0 or no) if its content must not be recorded, for example if it is considered to be incidental, of minor importance, not priority etc. to the user.

The process according to the invention also includes an initialisation step E0 during which a stream table TF is created and stored. This step E0 is implemented by the application server SA when the terminal is switched on for the first time by the user. This step E0 may also be implemented every time the terminal is switched on, but not necessarily, as an old, previously-stored table may, for example, be re-used.

The process according to the invention also includes an update step EM for the stream table; this step EM is implemented by the application server at any time at the demand of the user, a server or the management system S3 for the base BI broadcasting a multimedia stream and/or automatically according to a choice of streams for reproduction made by the user, as we shall see in the examples below. This step can also be implemented automatically when the terminal is switched on, after step E0 or in the absence of step E0.

During step E0 when the stream table is created, the application server SA creates and stores the stream table TF. In order to create the table TF, the application server lists, at a given moment, the streams F1, F2, F3 accessible by terminal T, each stream being represented by its identifier IDF1, IDF2, IDF3 and its associated preference indicator IC1, IC2, IC3. According to a variation, the server SA may also specify, for each stream, a pre-defined value for its preference indicator; said pre-defined value is, for example, supplied by server S1, S2 or the management system S3 supplying the corresponding stream or set arbitrarily by the application server SA. The stream table may be stored, for example on the application server (therefore remotely from the terminal), or in a storage area in the terminal or associated STB reserved for that purpose.

During the step EM when the stream table is updated, the server SA modifies, if necessary, the list of streams in the table TF (for example, if a new stream is available or on the contrary if a stream previously listed is no longer available at the time of the update). The table TF is then updated by the server SA on the user's instruction or automatically when a particular action of the user is detected, or when the table update is demanded by a server or by the management system S3 (e.g.: after an item of multimedia data has been updated).

The table can then be updated by the user at his demand. In order to do this, the user specifies, for each stream, whether the stream must be considered to be a principal stream or not, i.e. the specifies for each stream the value of its preference indicator IC1, IC2, IC3. If a preference indicator already has a pre-defined value, the user may keep this value or modify it.

The user orders the update of the table TF using a means of control, which may offer for this purpose for example one or more control buttons for moving through a list, a validation button and/or one or more selection buttons.

In a variation, the table can also be updated by the application server at the demand of a supplier of streams which wishes to have modified the value of the preference indicator associated with a stream which it is broadcasting. In another variation, the stream table can be updated automatically by the application server as the result of a particular action by the user. For example, when the user demands to change stream in the course of reproduction on his terminal, it can be arranged for the preference indicator for the stream originally being reproduced to be set automatically to a positive value in order to enable the user to return subsequently to the first stream without data loss.

Of course, it is possible to combine several variations so that the table can be modified by several entities: user, suppliers of TV streams, suppliers of multimedia services etc.

Suppose that the user demands reproduction of a first stream of his choice on his terminal (step E1). This demand is carried out in FIG. 1. Then, during reproduction of the first chosen stream, the user decides at a given moment to switch to a second stream (step E2).

This decision may be taken, for example, after the appearance on the terminal (step E3), in the first stream reproduced, of a multimedia data item drawing attention to the availability or update of a second stream: an image, icon, particular sound, video etc. As needed, said indication may occupy the whole surface of the screen, appear on a small area or from time to time mask the sound track of the first stream etc.

The user's decision may also be independent of any external offer presented in the first stream.

According to the invention, when the user demands to switch to the second stream, the second stream demanded is reproduced (step E4) and in parallel the value of the preference indicator for the first stream is verified (step E5). If the first stream which was previously being reproduced is marked as the principal stream (i.e. if its preference indicator IC is specified as such), then said first previously-reproduced stream is stored (step E6) in a memory space located, for example, in a memory in the STB decoder or remotely in the application server; in parallel, the second stream is reproduced (step E4).

Reproduction of the second stream ends (step E7) as needed:
at the demand of the user, who demands a change of stream or stoppage of all reproduction using his remote control, or
at the end of the second stream, if this second stream is of limited duration; this is the case for example with a weather bulletin, news bulletin, advertising film etc.

Finally, according to the invention, if it is necessary to return to the first stream which was originally reproduced, step E8 (either because the user has demanded it or automatically at the end of the second stream) and if the first stream is a principal stream (i.e. if its preference indicator is marked as such), step E9, then the first stream recorded during step E6 is reproduced on the terminal (step E10) and in parallel the continuation of the first stream is recorded (continuation of step E6). So, after watching and/or listening to the content of the second stream, the user can watch or listen to the continuation of the content of the first stream, certainly slightly delayed, but at least without data loss.

If the first stream is not a principal stream (i.e. if its preference indicator is negative), then reproduction of the first stream as it is broadcast resumes (step E11). In this case the user has lost the data broadcast during reproduction of the second stream, as in the past.

Reproduction of the first stream is stopped when (E12):
the user demands stoppage of reproduction of the first stream, or
reproduction of the first stream, recorded or not, is ended (end of broadcast or film etc.)
The user may then (step E13):
either demand reproduction of a new stream (new step E1) or stop all reproduction (end of process).

In a first practical example, there are accessible on the terminal two streams F1, F2 broadcast by television servers S1, S2 and multimedia data containing a weather bulletin, said data being broadcast by means of management system S3.

When the terminal is switched on, the stream table is created and stored by the application server (step E0); it lists the streams F1, F2, F3 accessible on the terminal T, their respective identifiers IDF1, IDF2, IDF3 and their respective preference indicators IC1, IC2, IC3 set as default to "no". The user updates the stream table (step EM) by stating the value IC1="yes", the values IC2, IC3 remaining equal to "no", then demands display of a film contained in stream F1 (step E2). After a certain period of reproduction of the film, an icon (step E3) appears in a corner of the screen indicating that a weather bulletin has just been updated and is available in stream F3. The user decides to watch said weather bulletin and demands its display on his terminal (step E2) by selecting the icon using a button provided for this purpose on his remote control. The weather bulletin contained in stream F2 is reproduced on the terminal (step E4). In parallel, in so far as stream F1 which was originally reproduced is a principal stream (IC1="yes", step E5), stream F1 is recorded and stored in a memory in the STB decoder of the user's terminal (step E6). The end of the weather bulletin (step E7) automatically results in a return to stream F1 which was previously being broadcast (step E8). Since stream F1 is a principal flow (step E9), the continuation of the film contained in recorded stream F1 is reproduced on the terminal (step E10) and recording of the received stream continues in parallel (step E6). At the end of the film the user switches off the terminal and therefore the reproduction of stream F1 (step E12).

In a second practical example, there are accessible on the terminal two streams F1, F2 broadcast by television servers S1, S2 and multimedia data containing a game, said data being broadcast by means of a management system S3. The game includes a series of questions relating to the film contained in stream F1 and the user can find in the film clues which help him to answer the questions asked.

When the terminal is switched on, the stream table is created and stored by the application server (step E0); it lists streams F1, F2, F3 accessible on the terminal T, their respective identifiers IDF1, IDF2, IDF3 and their respective preference indicators IC1, IC2, IC3 set as default to "no". The user does not update the stream table (no step EM is implemented) and simply demands reproduction of the film contained in stream F1 (step E2). After a certain period of time a musical animation (step E3) is heard via the terminal speakers and an icon is displayed on the screen indicating that a game is offered. The user decides to play and demands display of a question on his terminal (step E2) by selecting the icon using a button provided for this purpose on his remote control.

Selection of the game by the user leads to updating of the indicator IC1 to the value "yes" (step EM, implemented automatically as a result of the user's action). This automatic update then enables the user to return at intervals during the course of the game to the film F1 without a break so that he can view the whole of the film. The question contained in stream F3 is then reproduced on the terminal (step E4). In parallel, in so far as stream F1 which was originally reproduced is a principal flow (IC1="yes", step E5), stream F1 is recorded and stored in a memory in the STB decoder of the user's terminal (step E6). The user who can not answer the question asked demands to return to the film F1 (steps E7, E8). Since stream F1 is a principal stream (step E9), the continuation of the film contained in recorded stream F1 is reproduced on the terminal (step E1) and recording of received stream F1 continues in parallel (continuation of step E6). When he has found in the film an answer to the question in the game, the user interrupts reproduction of the film (step E12) and again demands reproduction of the game (new step E1) so that he can answer the question. The user can thus, in this example, answer a series of questions, alternating display of the film contained in stream F1 and display of the game contained in stream F3.

As we have seen previously, the invention is implemented by using a stream table in which are stored, for each stream F1, F2, F3, a stream identifier IDF1, IDF2, IDF3 and a preference indicator IC1, IC2, IC3. The preference indicators may be updated one or more times in the course of the process by the application server SA, regularly or not, as needed:
- at the demand of a broadcasting server broadcasting streams F1, F2 or F3, or
- at the demand of the user,
- automatically as a result of a pre-defined action of the user Of course, it may be disagreeable for the user if he notes that an undesired stream has been stored because the corresponding indicator has been changed to the possible detriment of a positive indicator previously specified by the user, without any warning of this being given to the latter.

In order to avoid this, an improvement of the invention consists of also defining, for each stream, a priority indicator IP1, IP2, IP3 in the following way.

A priority level is assigned to each entity likely to modify the preference indicators, the highest priority level preferably being assigned to the user; for example, the value 1 may be assigned to the priority indicator of the user, the value 2 to the priority indicator of the application server and the value 3 to the priority indicator of the broadcasting servers.

When the stream table is created, in addition to the stream identifier and the preference indicator, a modification indicator IM1, IM2, IM3 is specified for each stream; when the stream table is created, the modification indicators are initialised at a pre-defined value which is lower than all the priority indicators assigned to the entities likely to modify the preference indicators (in the example, the value 4 may used as the pre-defined value).

When a preference indicator IC1, IC2 or IC3 in the stream table is modified, the corresponding modification indicator IM1, IM2 or IM3 is updated to the value of the priority level of the entity which has demanded modification of the corresponding preference indicator; for example, if the user demands modification of preference indicator IC1 of stream F1, the modification indicator IM1 associated with stream F1 takes the value of the user's priority level IP1, in the example value 1; in another example, if the application server SA demands modification of preference indicator IC2 of stream F2, the modification indicator IM2 associated with stream F2 takes the value of the application server's priority level IP2, in the example value 2; etc.

An entity is authorised to modify a preference indicator IC only if its priority level IP is higher than the modification indicator IM associated with the preference indicator IC to be modified; for example, since modification indicator IM1 of stream F1 is equal to 1, the application server SA for which the priority level is equal to 2, and is therefore lower than 1, is not authorised to modify preference indicator IC1 of stream F1; however, since modification indicator IM3 of stream F3 is equal to 4 (its original value), the application server SA for which the priority level is equal to 2 is authorised to modify preference indicator IC3 of stream F3.

This improvement makes it possible to give priority to the wishes of one of the entities over the wishes of the other entities. So in the examples above, if a preference indicator has been modified by the user (highest priority level), it can not be modified by a supplier of services broadcasting a particular stream. The user's wish is thus considered to take priority.

FIG. 3 represents a recording device which can be used to implement the process according to the invention. This device includes in particular:
- a storage device, such as, for example, a RAM type memory or hard disk DD,
- an input/output device E/S to receive a multimedia stream,
- a control device, such as a central unit UC, to record in the storage device a multimedia stream received by the input/output device if said received stream is a principal stream which must be recorded.

A preference indicator specifies whether the received stream is a principal stream which must be recorded; this indicator is, for example, stored in a memory of the recording device or in a remote memory which is accessible to the control device.

The recording device may be integrated, for example, into the STB decoder associated with the terminal, into the terminal itself or even into the application server.

The invention claimed is:

1. A method of a process for automatic processing of multimedia streams intended to be reproduced on a reproduction terminal, including the following steps implemented by a computer processing system at the demand of a user of the reproduction terminal, said method comprising:
  reproducing a first stream on the reproduction terminal;
  interrupting reproduction of the first stream and reproducing a second stream on the reproduction terminal;
  associating with each stream a preference indicator specifying whether the corresponding stream is a principal stream or a secondary stream; and
  recording the first stream simultaneously with reproduction of the second stream if the first stream is a principal stream;
  the process further including an initialization step during which a stream table is created, the stream table including a preference indicator assigned to each stream, wherein a priority level is assigned to each entity in a group formed by the user, an application server, and stream suppliers, in the course of which, the process further includes the steps of:
  When updating the stream table, a preference indicator and a modification indicator are assigned to each stream; a preference indicator in the stream table is updated by the application server only if the priority level of the entity which demanded the update of said preference indicator is higher than the modification indicator associated with the preference indicator to be modified; then if an update has been implemented, the modification indicator associated with the updated preference indicator is replaced by the priority level associated with entity which demanded the modification.

2. The method according to claim 1, further including the following steps implemented simultaneously after stoppage of reproduction of the second stream:
reproducing the first, previously-recorded stream; and
continuing recording of the first stream.

3. The method according to claim 2, wherein reproduction of the second stream is stopped at the demand of the user, when the user demands reproduction of another stream, or at the end of reproduction of the second stream.

4. The method according to claim 1, wherein, during the initialization step, a default value is assigned to each preference indicator, the default value of the preference indicator associated with the stream being either a secondary value specifying said stream as a secondary stream or a value specified by a supplier of said stream.

5. The method according to claim 1, further including an updating step, the updating step updating the stream table in response to the instruction of the user, and/or the instruction of an authorized supplier, and/or at each pre-defined action of the user.

6. The method according to claim 5, wherein the action of the user likely to lead to updating of the stream table is a command to update the stream table, or a command to change the stream to be reproduced.

7. The method according to claim 5, in which an instruction of the user and/or an instruction of a supplier of a stream includes a value to be given to the preference indicator of a stream in the stream table.

8. The method according to claim 5, in which the updating step for the stream table ends with storage of said stream table in a memory of an application server remote from the terminal or in a memory of the terminal.

9. A non-transitory computer readable medium encoded thereon a computer program, said program including instructions when executed by a processor used to implement a process performing:
reproducing a first stream on a reproduction terminal;
interrupting reproduction of the first stream and reproducing a second stream on the reproduction terminal;
associating with each stream a preference indicator specifying whether the corresponding stream is a principal stream or a secondary stream; and
recording the first stream simultaneously with reproduction of the second stream if the first stream is a principal stream;
the process further including an initialization step during which a stream table is created, the stream table including a preference indicator assigned to each stream, wherein a priority level is assigned to each entity in a group formed by the user, an application server, and stream suppliers, in the course of which, the process further includes the steps of:
When updating the stream table, a preference indicator and a modification indicator are assigned to each stream; a preference indicator in the stream table is updated by the application server only if the priority level of the entity which demanded the update of said preference indicator is higher than the modification indicator associated with the preference indicator to be modified; then if an update has been implemented, the modification indicator associated with the updated preference indicator is replaced by the priority level associated with entity which demanded the modification.

10. A system for automatic processing of multimedia streams, including a terminal for reproduction of streams and a means of control to enable a user to interrupt the reproduction of a first stream and to demand the reproduction of a second stream on the terminal, the system further comprising:
means for managing streams in order to associate with each stream a preference indicator specifying whether the corresponding stream is a principal stream or a secondary stream;
means for recording the first stream simultaneously with reproduction of the second stream if the first stream is a principal stream;
means for initializing the creation of a stream table, the stream table including a preference indicator assigned to each stream;
means for assigning a priority level to each entity in a group formed by the user, an application server, and stream suppliers; and
means for updating the stream table,
wherein, when the stream table is updated, a preference indicator and a modification indicator are assigned to each stream, a preference indicator in the stream table is updated by the application server only if the priority level of the entity which demanded the update of said preference indicator is higher than the modification indicator associated with the preference indicator to be modified, and if an update has been implemented, the modification indicator associated with the updated preference indicator is replaced by the priority level associated with the entity which demanded the modification.

11. The system according to claim 10, further including a means for reproducing the first, previously-recorded stream after reproduction of the second stream stops.

12. The system according to claim 10, further including a memory to store the stream a table in which there is associated with each stream a preference indicator specifying whether said stream is a stream to be recorded or not.

13. The system according to claim 10, wherein the terminal includes means to control the recording device, and said recording device is located outside the terminal.

14. The system according to claim 10, wherein the recording device includes:
a storage device;
an input/output device to receive a multimedia stream; and
a control device to record in the storage device a multimedia stream received by the input/output device if said received stream is a principal stream which must be recorded.

* * * * *